(12) United States Patent
Vera et al.

(10) Patent No.: US 10,334,175 B1
(45) Date of Patent: Jun. 25, 2019

(54) SYSTEM AND METHOD FOR SENSOR POINTING CONTROL

(71) Applicant: RAYTHEON COMPANY, Waltham, MA (US)

(72) Inventors: Richard C. Vera, Allen, TX (US); Colin M. Johnston, McKinney, TX (US); April Danbee Canty, McKinney, TX (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 15/987,785

(22) Filed: May 23, 2018

(51) Int. Cl.
*G06G 7/80* (2006.01)
*H04N 5/232* (2006.01)
*G06T 7/246* (2017.01)
*G06T 7/73* (2017.01)

(52) U.S. Cl.
CPC ......... *H04N 5/23296* (2013.01); *G06T 7/248* (2017.01); *G06T 7/74* (2017.01); *G06T 2207/20021* (2013.01)

(58) Field of Classification Search
CPC ........ H04N 5/23296; G06T 7/74; G06T 7/248
USPC ......................................................... 348/169
See application file for complete search history.

(56) References Cited

U.S. PATENT DOCUMENTS 8,152,064 B2   4/2012   Svane et al.
9,817,099 B2   11/2017  Svane et al.

*Primary Examiner* — Nguyen T Truong
(74) *Attorney, Agent, or Firm* — Lewis Roca Rothgerber Christie LLP

(57) ABSTRACT

A system and method for pointing an imaging sensor. In one embodiment, the method includes forming a correlation surface; calculating, from the correlation surface, a first estimated target offset, the first estimated target offset being an estimate of an offset between a view of a target in the first subimage and a view of the target in the second subimage; and adjusting a pointing angle of the imaging sensor according to the first estimated target offset.

18 Claims, 9 Drawing Sheets

| -0.1111 | 0.2222 | -0.1111 | 0.2222 | 0.5556 | 0.2222 | -0.1111 | 0.2222 | -0.1111 |
|---|---|---|---|---|---|---|---|---|
| -0.1667 | 0.0 | 0.1667 | -0.1667 | 0.0 | 0.1667 | -0.1667 | 0.0 | 0.1667 |
| -0.1667 | -0.1667 | -0.1667 | 0.0 | 0.0 | 0.0 | 0.1667 | 0.1667 | 0.1667 |
| 0.2500 | 0.0 | -0.2500 | 0.0 | 0.0 | 0.0 | -0.2500 | 0.0 | 0.2500 |
| 0.1667 | -0.3333 | 0.1667 | 0.1667 | -0.3333 | 0.1667 | 0.1667 | -0.3333 | 0.1667 |
| 0.1667 | 0.1667 | 0.1667 | -0.3333 | -0.3333 | -0.3333 | 0.1667 | 0.1667 | 0.1667 |

*FIG. 6A*

$$a = \sum_{row=1}^{3} \sum_{col=1}^{3} \left( surface_{row,col} * Coeff_{1,row*(col-1)+col} \right)$$

$$b = \sum_{row=1}^{3} \sum_{col=1}^{3} \left( surface_{row,col} * Coeff_{2,row*(col-1)+col} \right)$$

$$c = \sum_{row=1}^{3} \sum_{col=1}^{3} \left( surface_{row,col} * Coeff_{3,row*(col-1)+col} \right)$$

$$d = \sum_{row=1}^{3} \sum_{col=1}^{3} \left( surface_{row,col} * Coeff_{4,row*(col-1)+col} \right)$$

$$e = \sum_{row=1}^{3} \sum_{col=1}^{3} \left( surface_{row,col} * Coeff_{5,row*(col-1)+col} \right)$$

$$f = \sum_{row=1}^{3} \sum_{col=1}^{3} \left( surface_{row,col} * Coeff_{6,row*(col-1)+col} \right)$$

FIG. 6B

SYSTEM AND METHOD FOR SENSOR POINTING CONTROL

GOVERNMENT LICENSE RIGHTS

This invention was made with Government support. The Government has certain rights in the invention.

FIELD

One or more aspects of embodiments according to the present invention relate to sensor pointing, and more particularly to a system and method for sensor pointing control, using images obtained from an imaging sensor.

BACKGROUND

In various commercial and military applications, it may be helpful to keep a sensor pointed at a fixed location in space, even as the platform on which the sensor is mounted moves. For example, a helicopter (e.g., a news helicopter or a firefighting helicopter) may include a video camera on a gimbal which may be used to monitor a fixed location on the ground while the helicopter flies in a circle to avoid the risk and increased fuel cost associated with hovering. In such a situation, a human operator may initially aim the sensor at a target of interest, and, in some systems, one or more inertial sensors may be employed to monitor subsequent motion of the platform, from which gimbal pointing changes may be calculated to cancel the effects of the platform motion, and corresponding commands may be sent to the gimbal to keep the sensor pointed at the target. In some cases, e.g., on a helicopter used for firefighting, tracking of the target may also be used, for example, to delivery fire retardant to the target, which may be a fire or a location (e.g., a building) to be protected from fire.

Systems based on inertial sensors, however, may suffer from drift. Moreover, the algorithms used to calculate the desired gimbal pointing changes may rely on information about the elevation of the target, which may be inaccurate, for example if the target is on a tall building not included in the elevation model used.

Thus, there is a need for an improved system and method for sensor pointing control.

SUMMARY

According to an embodiment of the present disclosure there is provided a method for pointing an imaging sensor, the method including: forming a correlation surface, the correlation surface being a two-dimensional array, an element of the correlation surface being a measure of an offset difference between: a first subimage, the first subimage being a subimage of a first image, the first subimage being centered at a first location in the first image; and a second subimage, the second subimage being a subimage of a second image, the second subimage being centered at the first location in the second image, the offset difference being calculated for an offset corresponding to coordinates of the element; calculating, from the correlation surface, a first estimated target offset, the first estimated target offset being an estimate of an offset between a view of a target in the first subimage and a view of the target in the second subimage; and adjusting a pointing angle of the imaging sensor according to the first estimated target offset.

In one embodiment, forming a correlation surface includes calculating the value of the element of the correlation surface as a sum of absolute differences of: pixels of the first subimage, and pixels of the second subimage, each absolute difference being a difference between a pixel of the first subimage and a pixel of the second subimage, the pixel of the second subimage being at a location, in the second subimage, differing, from the location, in the first subimage, of the pixel of the first subimage, by an offset corresponding to coordinates of the element.

In one embodiment, the calculating, from the correlation surface, a first estimated target offset includes finding a smallest element of the correlation surface.

In one embodiment, the calculating, from the correlation surface, a first estimated target offset includes fitting a two-dimensional second order polynomial to the correlation surface, and calculating coordinates of a minimum value of the two-dimensional second order polynomial.

In one embodiment, fitting a two-dimensional second order polynomial to the correlation surface includes calculating a coefficient of the two-dimensional second order polynomial as a weighted sum of elements of a subarray of the correlation surface.

In one embodiment, the subarray is a three by three subarray of the correlation surface, the three by three subarray being centered on a smallest element of the correlation surface.

In one embodiment, calculating coordinates of a minimum value of the two-dimensional second order polynomial includes calculating: $x=(dc-2fb)/(4ef-d^2)$, and $y=(db-2ec)/(4ef-d^2)$, wherein $a+bx+cy+dxy+ex^2+fy^2$ is the two-dimensional second order polynomial.

In one embodiment, the method includes calculating a second estimated target offset from a third subimage and a fourth subimage, the third subimage being a subimage of the first image, and the fourth subimage being a subimage of the second image.

In one embodiment, the third subimage is centered on a corner of the first subimage and the fourth subimage is centered on the same corner of the second subimage.

According to an embodiment of the present disclosure there is provided a system for tracking a target, the system including: an imaging sensor; and a processing circuit configured to: form a correlation surface, the correlation surface being a two-dimensional array, an element of the correlation surface being a measure of an offset difference between: a first subimage, the first subimage being a subimage of a first image, the first subimage being centered at a first location in the first image; and a second subimage, the second subimage being a subimage of a second image, the second subimage being centered at the first location in the second image, the offset difference being calculated for an offset corresponding to coordinates of the element; calculate, from the correlation surface, a first estimated target offset, the first estimated target offset being an estimate of an offset between a view of a target in the first subimage and a view of the target in the second subimage; and adjust a pointing angle of the imaging sensor according to the first estimated target offset.

In one embodiment, the processing circuit is configured to form the correlation surface by calculating the value of an element of the correlation surface as a sum of absolute differences of: pixels of the first subimage, and pixels of the second subimage, each absolute difference being a difference between a pixel of the first subimage and a pixel of the second subimage, the pixel of the second subimage being at a location, in the second subimage, differing, from the location, in the first subimage, of the pixel of the first subimage, by an offset corresponding to coordinates of the element.

In one embodiment, the processing circuit is configured to calculate, from the correlation surface, a first estimated target offset, by calculating a smallest element of the correlation surface.

In one embodiment, the processing circuit is configured to calculate, from the correlation surface, a first estimated target offset, by fitting a two-dimensional second order polynomial to the correlation surface, and calculating coordinates of a minimum value of the two-dimensional second order polynomial.

In one embodiment, the processing circuit is configured to calculate a coefficient of the two-dimensional second order polynomial as a weighted sum of elements of a subarray of the correlation surface.

In one embodiment, the subarray is a three by three subarray of the correlation surface, the three by three subarray being centered on a smallest element of the correlation surface.

In one embodiment, the processing circuit is configured to calculate the coordinates of the minimum value of the two-dimensional second order polynomial by calculating: $x=(dc-2fb)/(4ef-d^2)$, and $y=(db-2ec)/(4ef-d^2)$, wherein $a+bx+cy+dxy+ex^2+fy^2$ is the two-dimensional second order polynomial.

In one embodiment, the processing circuit is further configured to calculate a second estimated target offset from a third subimage and a fourth subimage, the third subimage being a subimage of the first image, and the fourth subimage being a subimage of the second image.

In one embodiment, the third subimage is centered on a corner of the first subimage and the fourth subimage is centered on the same corner of the second subimage.

BRIEF DESCRIPTION OF THE DRAWINGS

Features, aspects, and embodiments are described in conjunction with the attached drawings, in which:

FIG. 6A is a table of weights, according to an embodiment of the present invention;

FIG. 6B is a set of equations, according to an embodiment of the present invention.

DETAILED DESCRIPTION

The detailed description set forth below in connection with the appended drawings is intended as a description of exemplary embodiments of a system and method for sensor pointing control provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
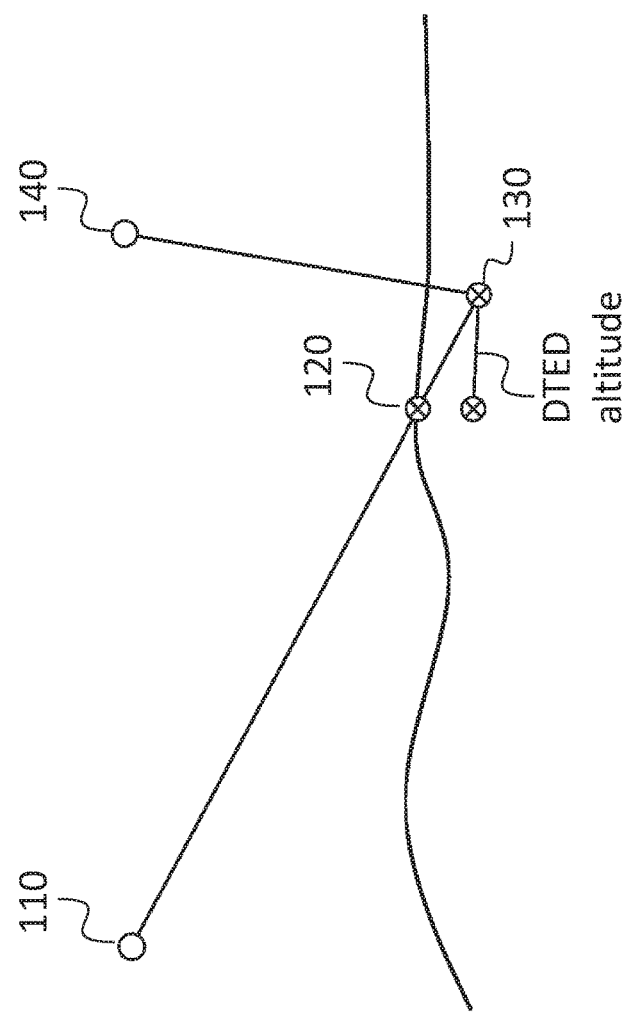
FIG. 1 is a schematic diagram of a method for target tracking, according to an embodiment of the present invention.

Referring to FIG. 1, a platform (e.g., an aircraft) carrying a sensor may obtain, at a first sensor position 110, a first direction to a target 120, e.g., as a result of a human operator pointing the sensor at the target 120. From the direction to the target 120, and an estimated elevation of the target 120 (which may be obtained from digital terrain elevation data (DTED)), a pointing system may estimate the location of the target 120 (e.g., by calculating the point of intersection of (i) a line through the first sensor position 110 in the direction of the target 120 with (ii) a surface at the estimated elevation of the target 120). If the estimated elevation of the target 120 is inaccurate as shown, an error in the estimated location 130 of the target 120 may result, as shown. When the sensor has moved, along with the platform, to a second sensor position 140, the calculated direction to the estimated location 130 of the target 120 may be in error as a result of the error in the estimated location 130 of the target 120 (and possibly as a result of additional errors (not shown) resulting from drift in the platform position estimate based on inertial sensors). In some embodiments the performance of the target tracking operation illustrated in FIG. 1 may be improved.

Figure 2:
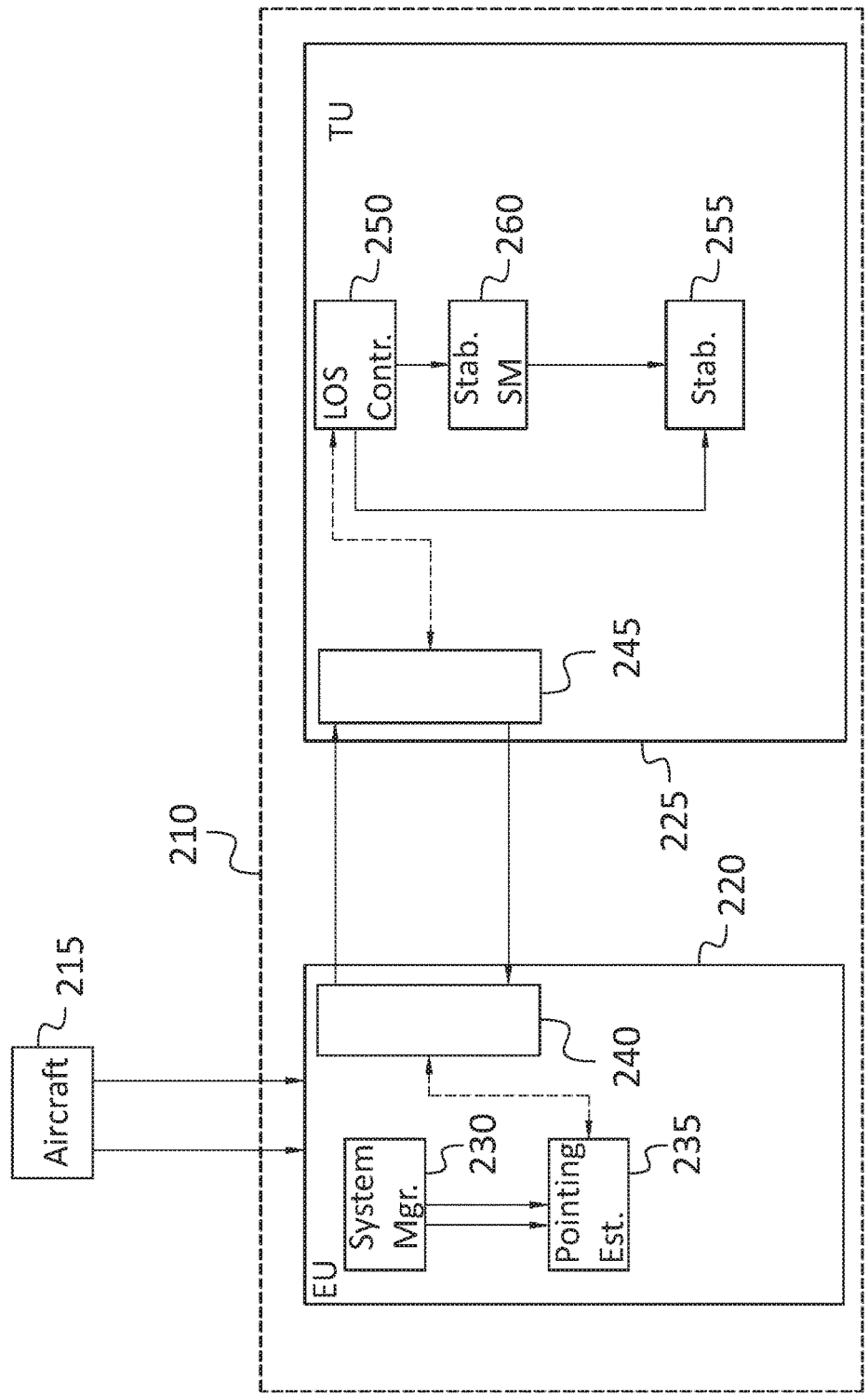
FIG. 2 is a block diagram of a system for target tracking, according to an embodiment of the present invention.

Referring to FIG. 2, in some embodiments a pointing estimation and control system 210 operating with a pointing sensor on a gimbal secured to an aircraft 215 includes an estimation unit (EU) 220 and a tracking unit (TU) 225. The estimation unit 220 includes a system manager 230, a pointing angle change estimator 235, and a messaging interface 240 for communicating with the tracking unit 225 through a corresponding messaging interface 245 in the tracking unit 225. The tracking unit 225 further includes a line-of-sight controller (LOS Contr.) 250 that communicates with a stabilization circuit 255 through a stabilization system shared memory 260.

Figure 3A:
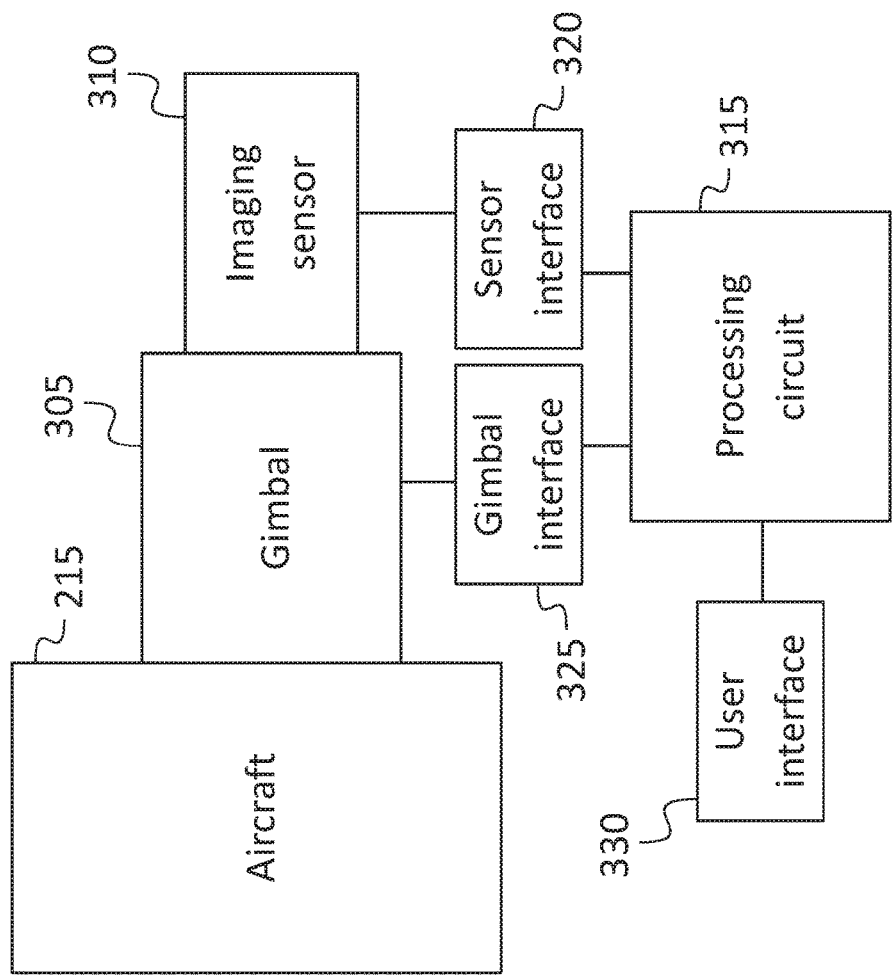
FIG. 3A is a block diagram of a system for target tracking, according to an embodiment of the present invention.

FIG. 3A is a block diagram of a system for target tracking. A gimbal 305 is secured to an aircraft 215 and supports an imaging sensor 310. In some embodiments, a processing circuit 315 (discussed in further detail below) receives images from the imaging sensor 310 through a sensor interface circuit 320, and controls the gimbal 305 through a gimbal interface circuit 325. The processing circuit 315 further interacts with an operator through a user interface 330, which may include, for example, a display for displaying images (e.g., images from the imaging sensor 310) to the operator and a user input device (e.g., a joystick) to receive user commands (e.g., commands to steer the gimbal). In some embodiments a user viewing a display in the user interface 330 identifies a target and points the imaging sensor 310 at the target (e.g., by actuating a joystick until the target is at the center of the display). The user then releases the joystick, and may also command the processing circuit 315 to begin automated tracking of the target (e.g., by clicking a suitable button using a mouse that may also be part of the user interface 330). The command to begin automated tracking of the target may cause the processing circuit 315 to capture an image referred to herein as a "reference image", and which may be an image containing a view of the target at a reference position in (e.g., at the center of) the image. The terminology "a view of the target"

is used herein to refer to a representation of the target in the image (the terminology "an image of the target in the image" is avoided herein because of the potential for confusion resulting from the use of two different meanings of the word "image" in such terminology). In some embodiments a scene based correlation algorithm that uses a sum of absolute differences (SAD) correlator to produce a two dimensional correlation surface and that further uses a parabolic curve fit is then used to automatically track the target in the field of view of the imaging sensor 310.

Automated tracking may include two operations: gimbal angle error estimation and gimbal commanding, the gimbal commanding being performed to reduce the gimbal angle error, thereby adjusting the pointing angles of the imaging sensor 310 to point more nearly (or exactly) at the target. Gimbal angle error estimation may include estimating an offset (or "target offset") between (i) the position of a view of the target in a current (e.g., most recently obtained) image from the imaging sensor 310, and (ii) the reference position (i.e., the position of the view of the target in the reference image). As used herein, an "offset" is a vector quantity including, for example, a horizontal (or "x") component of the offset and a vertical (or "y") component of the offset; accordingly an offset may also be referred to as an "offset vector". This estimating, which produces a target offset estimate, may also be referred to as "image registration". The target offset may be estimated by calculating an offset difference between a subimage of the reference image and a subimage of the current image, for various trial offsets, and identifying an offset for which the offset difference is smallest (or, e.g., if fractional-pixel precision is to be obtained, is expected to be smallest). As used herein, an "offset difference" between a first image and a second image is a measure of the extent to which the first image differs from a shifted version of the second image, the shifted version of the second image being shifted by the offset.

The target offset estimate may be converted to a gimbal angle error estimate by a suitable transformation. For example, if the coordinates of the imaging sensor 310 are aligned with the axes of the gimbal 305 (e.g., if the x direction on the imaging sensor 310 corresponds to gimbal azimuth angle and the y direction on the imaging sensor 310 corresponds to gimbal elevation angle) then the transformation may be a diagonal transformation consisting of two scale factors, one for azimuth and one for elevation.

Figure 3B:
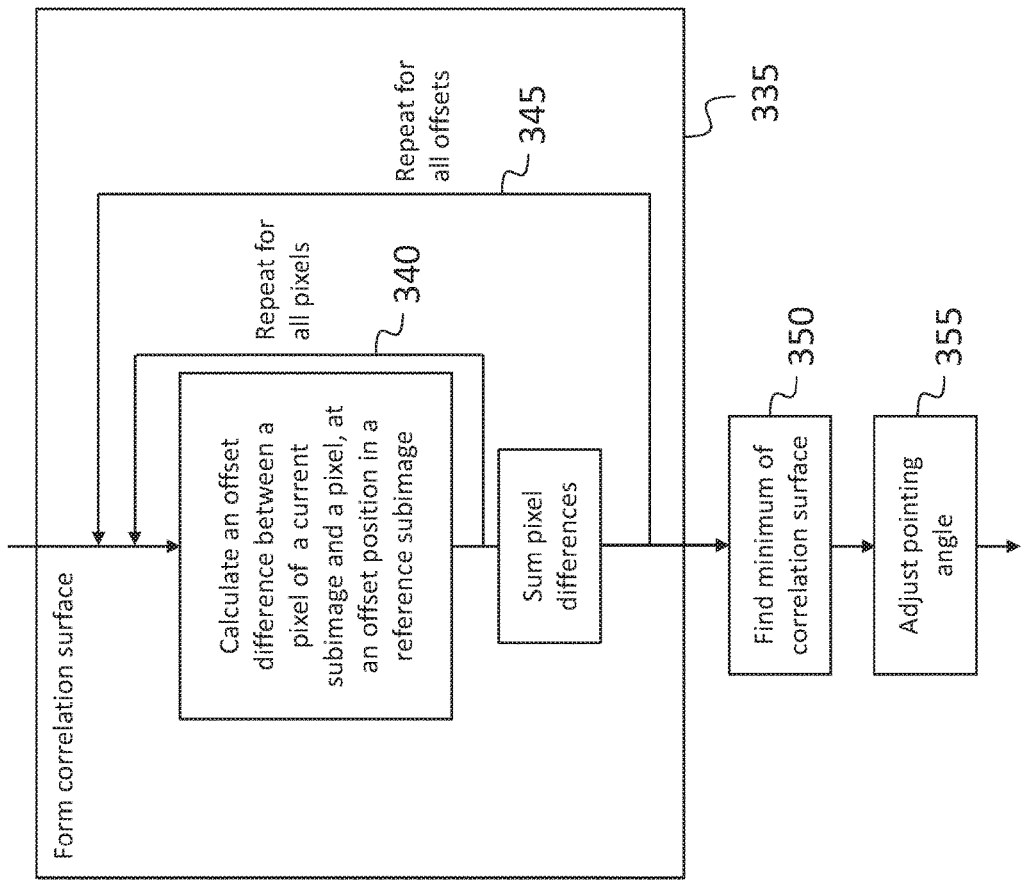
FIG. 3B is a flow chart of a method for target tracking, according to an embodiment of the present invention.

The target offset may be calculated by forming a correlation surface for the subimage of the reference image and the subimage of the current image, and finding a minimum value of the correlation surface. Each point on the correlation surface may be a measure of how different the two subimages are when one is offset (i.e., translated) relative to the other. For example, if the target moved by five pixels to the right between the taking of the reference image and the taking of the current image, it may be expected that the correlation will be high (and the difference small) when the current image is offset by five pixels to the left, so that the target is again in the same position as in the reference image. Referring to FIG. 3B, in some embodiments the correlation surface is formed, at 335, as a result of two nested operations, of which the inner one 340 calculates pixel differences between the reference subimage and the current subimage, with the current subimage offset by a certain amount, and the outer one 345 repeats the calculation for each of a plurality of offsets, each corresponding to a point on the correlation surface. A target offset estimate may then be found as a minimum of the correlation surface, at 350 (as discussed in further detail below) and the pointing angle may be adjusted, at 355, in accordance with the target offset estimate.

In some embodiments a procedure for pixel-level image registration includes calculating the correlation between two images using a specific similarity measure for various trial offsets. The procedure may begin with two two-dimensional data arrays, each representing a respective image: a first array F and a second array S. The first array has R rows (e.g., in the elevation dimension) and C columns (e.g., in the azimuth dimension). The second array S is somewhat larger, having dimensions R+2I and C+2J, where I and J are integers. The first array may be a subarray of the array representing the reference image (or, in an alternate embodiment, of the array representing the current image), and the second array may be a larger subarray of the current image (or, in the alternate embodiment, of the array representing the reference image). The first subarray may be centered at (i.e., it may have a center at) a first location in the array representing the reference image (e.g., the first location may be a location identified by the user as the location of a target to be tracked). The sum of absolute differences (SAD) is then defined as $$D(i, j) = \sum_{m=0}^{R-1} \sum_{n=0}^{C-1} |\mathcal{F}(m, n) - S(m + i, n + j)|,$$

$$-I \leq i \leq I, -J \leq j \leq J.$$

Any symbol in italic font or in another font in an equation herein and elsewhere in this disclosure has the same meaning as the same symbol in plain font. As used herein, a "subarray" of a square or rectangular array is a contiguous square or rectangular subset of elements of the array, where the subset need not be a proper subset (i.e., the subarray may be the entire array). Similarly a "subimage" of an image is either the entire image or a contiguous square or rectangular subset of the pixels of the image. The SAD is an example of an offset difference, as defined above.

Figure 4:
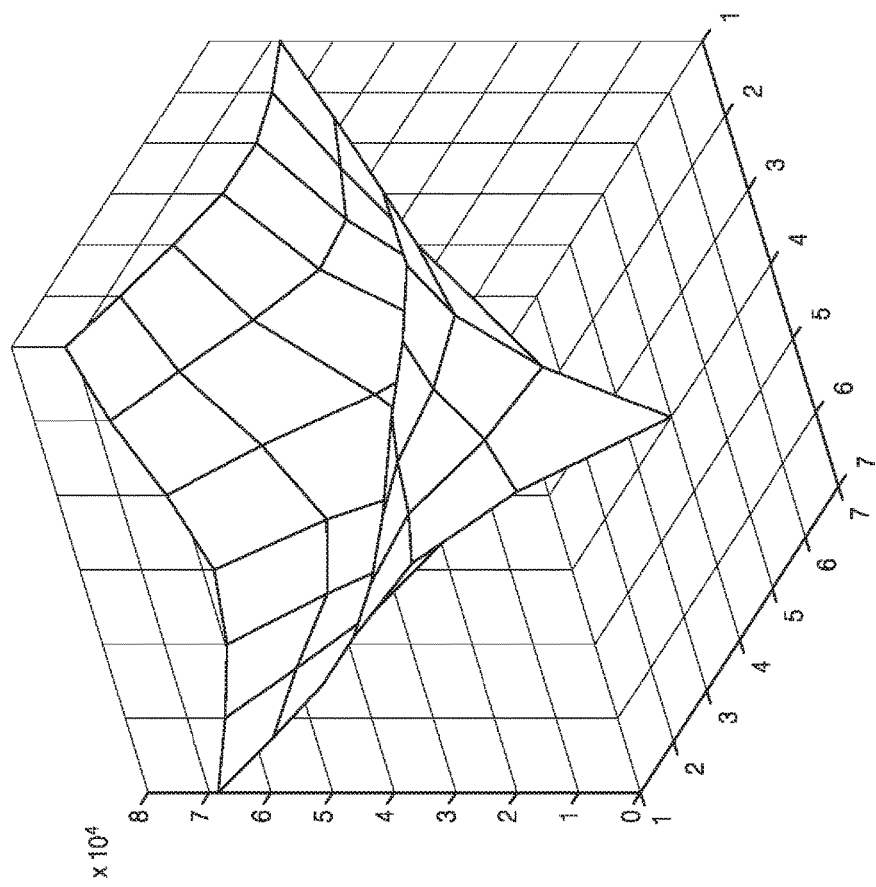
FIG. 4 is a graph of a correlation surface, according to an embodiment of the present invention.

The complete set of $(2I+1)*(2J+1)$ SAD values may be referred to as the correlation surface. If, for example, $I=3$ and $J=3$, the correlation surface is composed of a 7×7 pixel surface which includes 49 points. An example of a correlation surface is shown in FIG. 4.

A "best match" offset may then be found as follows. Given a first image and a second image, the SAD correlation, $D(i,j)$, is computed for a set of trial offsets $(i,j)$, and the offset $(a_0, b_0)$ that yields the minimum SAD value $D_0$ is found, i.e., $$D_0 = D(a_0, b_0) = \min_{(i,j)} D(i, j).$$

The minimum may be found by performing an exhaustive search of $D(i,j)$, i.e., testing each value of $D(i,j)$, or, if $D(i,j)$ is large, by another method, e.g., using a gradient descent search, which may be more computationally efficient, but which may carry a risk of finding a local minimum instead of a global minimum.

The best match estimated target offset has a precision of one pixel in each dimension, i.e., it does not provide sub-pixel resolution. In some embodiments, sub-pixel resolution may be obtained by taking into account the SAD of adjacent points, as follows. Four corrections are calculated:

$$\text{right\_correction} = 0.5 * \frac{D_0}{D_0 + D(a_0 + 1, b_0)}$$

$$\text{left\_correction} = 0.5 * \frac{D_0}{D_0 + D(a_0 - 1, b_0)}$$

$$\text{top\_correction} = 0.5 * \frac{D_0}{D_0 + D(a_0, b_0 - 1)}$$

$$\text{bottom\_correction} = 0.5 * \frac{D_0}{D_0 + D(a_0, b_0 + 1)}$$

The adjusted best match target offset estimate $(a_0,b_0)'$ may then be calculated as follows:

$(a_0,b_0)'=(a_0+\text{right\_correction}-\text{left\_correction},b_0+\text{bottom\_corrrection}-\text{top\_correction})$.

These terms allow up to a one-quarter-pixel correction in either dimension.

Figure 5:
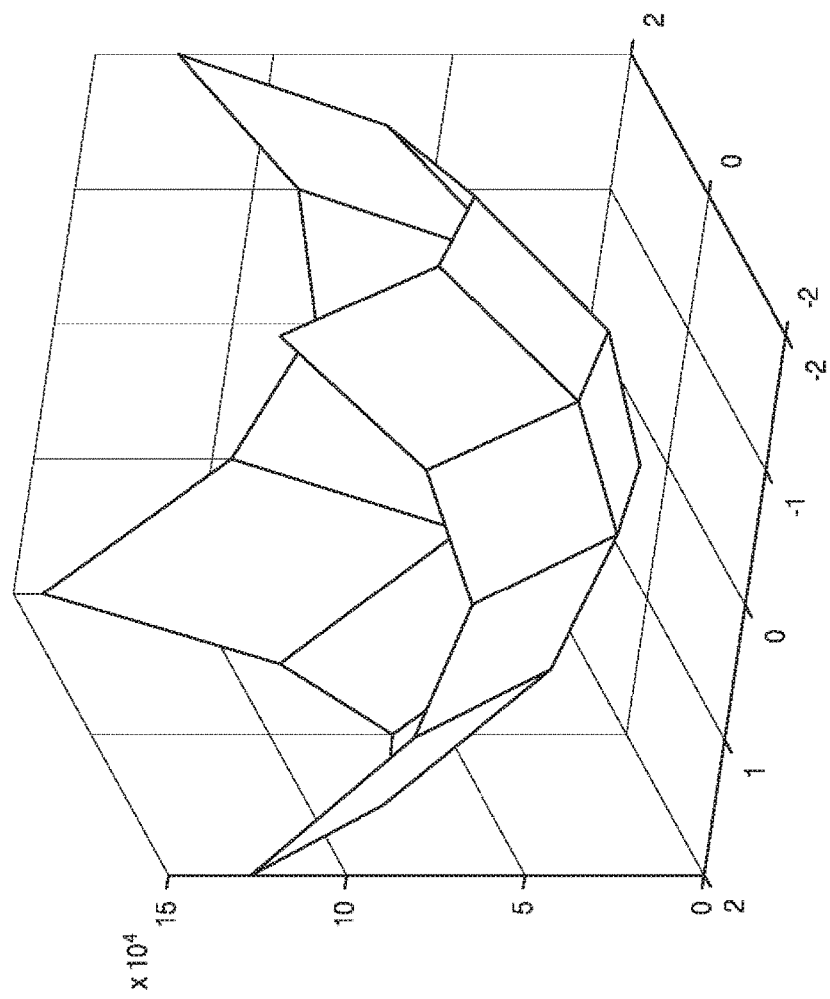
FIG. 5 is a graph of a paraboloid, according to an embodiment of the present invention.

In other embodiments, an estimated target offset may be formed, with sub-pixel resolution, using correlation interpolation. Once the correlation surface has been calculated, an interpolating surface (e.g., a "bowl" such as a paraboloid, represented by a two-dimensional second order polynomial) may be fit to samples of the correlation surface and the minimum of the interpolating surface may be found, e.g., using a search, or if the interpolating surface has a suitable functional form, using one or more closed form equations. An example of such a paraboloid is shown in FIG. 5.

For an interpolating surface that is a paraboloid given by the following equation, $Z=a+bx+cy+dxy+ex^2+fy^2$, the coefficients for which the paraboloid is a least-squares best fit to the correlation surface may be found by taking weighted sums of the elements of the correlation surface (i.e., of the 49 elements of the array defining the correlation surface, for a 7×7 correlation surface). Weights that may be used in forming these weighted sums are given in the table of FIG. 6A, with each of the five rows of the table being the set of weights to be used for calculating a respective one of the five coefficients of the paraboloid. The explicit equations for forming the weighted sums are shown in FIG. 6B. Each of these equations may be implemented as a dot product of (i) one row of the table and (ii) the elements of the correlation surface, rearranged to form a 7×1 vector.

Expressions for the coordinates of the minimum of the paraboloid may be found by setting to zero (i) the partial derivative of the paraboloid with respect to x and (ii) the partial derivative of the paraboloid with respect to y, and solving the linear system that results (a system of two linear equations with two unknowns, x and y), for x and y. The results are:

$$x = \frac{dc - 2fb}{4ef - d^2}$$

and $$y = \frac{db - 2ec}{4ef - d^2}.$$

In some embodiments, before the fit of the paraboloid of FIG. 5 to the correlation surface of FIG. 4 is performed, the minimum value of the correlation surface is found (e.g., using an exhaustive search), and if the minimum value of the correlation surface is on an edge of the correlation surface, the target offset estimation attempt is terminated. This approach may be motivated by the observation that if the minimum value of the correlation surface is on an edge of the correlation surface, the accuracy of any estimated target offset obtained by fitting a paraboloid to the correlation surface may be low.

Several expected accuracy tests of the correlation surface may be performed, to identify circumstances in which there is a high risk that the target offset estimate may be inaccurate. To perform these tests, a "signal" value is defined to be the minimum value on the correlation surface, and a "background" value is defined to be the minimum value on the correlation surface outside of a 3×3 subarray, of the correlation surface, centered on the minimum value on the correlation surface. The following constants may be used to perform the expected accuracy tests:

K SNR=26
theta=0.9
sum 1 theta=49/theta
sum 2 theta=9

If the difference between the background and the signal multiplied by the constant K SNR is less than the background, the target offset estimation attempt may be terminated. If the difference between the background and the signal is less than 100, the target offset estimation attempt may be terminated.

A test for low signal to noise ratio (SNR) and high signal strength may also be used. Such a test may compare the sum of the values for the entire correlation surface with the values that are part of the 3×3 subarray, of the correlation surface, centered on the minimum value on the correlation surface. Since there are only 9 values for the 3×3 subarray and 49 values for the entire surface, the entire surface sum is multiplied by 9 and the 3×3 subarray is multiplied by 49/theta. If the sum for the 3×3 subarray multiplied by 49/theta is greater than the sum for the entire surface multiplied by 9, the target offset estimation attempt may be terminated.

Tests for "shape errors' may also be performed to assess the validity of the target offset estimate. For example, in some embodiments the denominator of the expression for x (which is equal to the denominator of the expression for y):

$$4ef-d^2$$

is tested before the values of x and y are returned as coordinates of a target offset estimate. If this denominator is less than or equal to zero (or less than a threshold, as discussed in further detail below), the paraboloid has no unique minimum value (it may instead have a saddle point, for example). In some embodiments the signs of e and f are compared and e and f do not have the same sign the system concludes that the paraboloid has no unique minimum value (because their having different signs will result in denominator being less than or equal to zero). When the system concludes that the paraboloid has no unique minimum value, then (i) the target offset estimation attempt may be terminated, or (ii) the best match estimated target offset, or an adjusted best match target offset estimate, may be returned (instead of a target offset estimate using correlation interpolation with a paraboloid).

The following constants may be used to set a threshold to identify this circumstance:

ktemp=2.0004
denominator theta=300.0*ktemp*ktemp

To use this threshold, the system may compare the denominator to the constant denominator theta, and if the denominator is less than denominator theta, then (i) the target offset estimation attempt may be terminated, or (ii) the best match estimated target offset, or an adjusted best match target offset estimate, may be returned.

In some embodiments, a target offset estimate that corresponds to the target being above the horizon is discarded (based on the assumption that the target will always be at an elevation lower than that of the platform).

Figure 7:
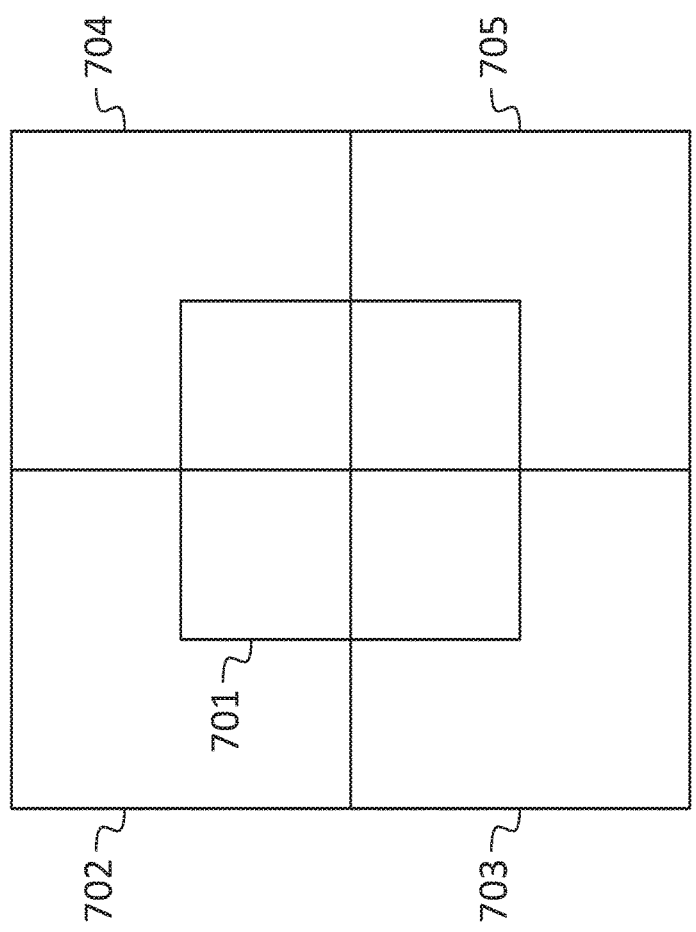
FIG. 7 is a subimage placement diagram, according to an embodiment of the present invention.

Referring to FIG. 7, in some embodiments, the method described above may be repeated five times, for each current image. Five attempts to obtain target offset estimates are performed for each current image, each of the attempts corresponding to a respective one of five subimages 701, 702, 703, 704, 705 of the current image (and on a corresponding subimage of the reference image). First subimage 701 may, for example, be centered in the image, and each of the remaining four subimages 702, 703, 704, 705 may be centered on a respective corner of the first subimage 701.

In some embodiments the resulting estimates are combined using the following equation to combine measurements:

$$X = \frac{\sigma_2}{\sigma_1 + \sigma_2} X_1 + \frac{\sigma_1}{\sigma_1 + \sigma_2} X_2$$

and the following equation to combine the standard deviations ("sigmas"):

$$\sigma = \frac{1}{\sqrt{\frac{1}{\sigma_1^2} + \frac{1}{\sigma_1^2}}} = \sqrt{\frac{\sigma_1^2 \sigma_2^2}{\sigma_1^2 + \sigma_2^2}}$$

Each measurement is combined with all the other measurements using this method. The processing described in the pseudocode of Table 1 is then performed for each estimate:

TABLE 1

| | |
|---|---|
| 1 | For k = 1: number of estimates and estimate is valid: |
| 2 | X1 = estimate(k) |
| 3 | X = X1 |
| 4 | Sigma1 = K (Constant currently set to 1.5) |
| 5 | For j = 1: number of estimates and estimate is valid (not including estimate k) |
| 6 | X2 = estimate(j) |
| 7 | Sigma2 = delta between estimate(j) and estimate(k) squared + K (1.5). |
| 8 | Use the equations above to update X and sigma. |
| 9 | End loop |
| 10 | End loop |

The combination (X) with the smallest sigma is selected as the offset. This has the effect of selecting the valid estimate which is closest to the other valid estimates. For example, if the estimates for five valid windows were (1,1), (2,2), (3,3), (4,4), and (5,5), the combination for the third estimate would be used.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

Although limited embodiments of a system and method for sensor pointing control have been specifically described and illustrated herein, many modifications and variations will be apparent to those skilled in the art. Accordingly, it is to be understood that a system and method for sensor pointing control employed according to principles of this invention may be embodied other than as specifically described herein. The invention is also defined in the following claims, and equivalents thereof.

What is claimed is:

1. A method for pointing an imaging sensor, the method comprising:
   forming a correlation surface, the correlation surface being a two-dimensional array, an element of the correlation surface being a measure of an offset difference between:
   a first subimage, the first subimage being a subimage of a first image, the first subimage being centered at a first location in the first image; and
   a second subimage, the second subimage being a subimage of a second image, the second subimage being centered at the first location in the second image,
   the offset difference being calculated for an offset corresponding to coordinates of the element;
   calculating, from the correlation surface, a first estimated target offset, the first estimated target offset being an estimate of an offset between a view of a target in the first subimage and a view of the target in the second subimage; and
   adjusting a pointing angle of the imaging sensor according to the first estimated target offset.

2. The method of claim 1, wherein forming a correlation surface comprises calculating the value of the element of the correlation surface as a sum of absolute differences of:
   pixels of the first subimage, and
   pixels of the second subimage,
   each absolute difference being a difference between a pixel of the first subimage and a pixel of the second subimage, the pixel of the second subimage being at a location, in the second subimage, differing, from the location, in the first subimage, of the pixel of the first subimage, by an offset corresponding to coordinates of the element.

3. The method of claim 1, wherein the calculating, from the correlation surface, a first estimated target offset comprises finding a smallest element of the correlation surface.

4. The method of claim 1, wherein the calculating, from the correlation surface, a first estimated target offset comprises fitting a two-dimensional second order polynomial to the correlation surface, and calculating coordinates of a minimum value of the two-dimensional second order polynomial.

5. The method of claim 4, wherein fitting a two-dimensional second order polynomial to the correlation surface comprises calculating a coefficient of the two-dimensional second order polynomial as a weighted sum of elements of a subarray of the correlation surface.

6. The method of claim 5, wherein the subarray is a three by three subarray of the correlation surface, the three by three subarray being centered on a smallest element of the correlation surface.

7. The method of claim 4, wherein calculating coordinates of a minimum value of the two-dimensional second order polynomial comprises calculating:

$$x=(dc-2fb)/(4ef-d^2), \text{ and}$$

$$y=(db-2ec)/(4ef-d^2),$$

wherein $a+bx+cy+dxy+ex^2+fy^2$ is the two-dimensional second order polynomial.

8. The method of claim 1, further comprising calculating a second estimated target offset from a third subimage and a fourth subimage, the third subimage being a subimage of the first image, and the fourth subimage being a subimage of the second image.

9. The method of claim 8, wherein the third subimage is centered on a corner of the first subimage and the fourth subimage is centered on the same corner of the second subimage.

10. A system for tracking a target, the system comprising:
an imaging sensor; and
a processing circuit configured to:
form a correlation surface, the correlation surface being a two-dimensional array, an element of the correlation surface being a measure of an offset difference between:
a first subimage, the first subimage being a subimage of a first image, the first subimage being centered at a first location in the first image; and
a second subimage, the second subimage being a subimage of a second image, the second subimage being centered at the first location in the second image,
the offset difference being calculated for an offset corresponding to coordinates of the element;
calculate, from the correlation surface, a first estimated target offset, the first estimated target offset being an estimate of an offset between a view of a target in the first subimage and a view of the target in the second subimage; and
adjust a pointing angle of the imaging sensor according to the first estimated target offset.

11. The system of claim 10, wherein the processing circuit is configured to form the correlation surface by calculating the value of an element of the correlation surface as a sum of absolute differences of:
pixels of the first subimage, and
pixels of the second subimage,
each absolute difference being a difference between a pixel of the first subimage and a pixel of the second subimage, the pixel of the second subimage being at a location, in the second subimage, differing, from the location, in the first subimage, of the pixel of the first subimage, by an offset corresponding to coordinates of the element.

12. The system of claim 10, wherein the processing circuit is configured to calculate, from the correlation surface, a first estimated target offset, by calculating a smallest element of the correlation surface.

13. The system of claim 10, wherein the processing circuit is configured to calculate, from the correlation surface, a first estimated target offset, by fitting a two-dimensional second order polynomial to the correlation surface, and calculating coordinates of a minimum value of the two-dimensional second order polynomial.

14. The system of claim 13, wherein the processing circuit is configured to calculate a coefficient of the two-dimensional second order polynomial as a weighted sum of elements of a subarray of the correlation surface.

15. The system of claim 14, wherein the subarray is a three by three subarray of the correlation surface, the three by three subarray being centered on a smallest element of the correlation surface.

16. The system of claim 13, wherein the processing circuit is configured to calculate the coordinates of the minimum value of the two-dimensional second order polynomial by calculating:

$$x=(dc-2fb)/(4ef-d^2), \text{ and}$$

$$y=(db-2ec)/(4ef-d^2),$$

wherein $a+bx+cy+dxy+ex^2+fy^2$ is the two-dimensional second order polynomial.

17. The system of claim 10, wherein the processing circuit is further configured to calculate a second estimated target offset from a third subimage and a fourth subimage, the third subimage being a subimage of the first image, and the fourth subimage being a subimage of the second image.

18. The system of claim 17, wherein the third subimage is centered on a corner of the first subimage and the fourth subimage is centered on the same corner of the second subimage.

* * * * *